United States Patent [19]

Sokolowski et al.

[11] Patent Number: 4,619,862
[45] Date of Patent: Oct. 28, 1986

[54] PARTICULATE PAPER PRODUCT, ESPECIALLY FOR USE AS ANIMAL LITTER

[75] Inventors: Robert C. Sokolowski, Menasha; Russell L. Johnson, Weyauwega, both of Wis.

[73] Assignee: Kimberly-Clark Corporation, Neenah, Wis.

[21] Appl. No.: 482,366

[22] Filed: Apr. 5, 1983

Related U.S. Application Data

[63] Continuation-in-part of Ser. No. 463,100, Feb. 2, 1983, abandoned.

[51] Int. Cl.⁴ .............................................. B32B 23/00
[52] U.S. Cl. ........................................ 428/221; 119/1; 428/326; 428/357; 428/372; 428/913
[58] Field of Search ................ 57/259, 260; 162/111; 119/1; 428/284, 280, 282, 326, 298, 402, 537, 372, 357, 221, 913

[56] References Cited

U.S. PATENT DOCUMENTS

| 4,100,017 | 7/1978 | Flautt .................................. 162/111 |
| 4,225,382 | 9/1980 | Kearney et al. ..................... 162/111 |
| 4,378,756 | 4/1983 | Whiteman ............................ 119/1 |

Primary Examiner—James J. Bell
Attorney, Agent, or Firm—Gregory E. Croft; Donald L. Traut; Jeremiah J. Duggan

[57] ABSTRACT

Discrete absorbant particles, useful for example as an animal litter, are produced by joining together layers of formed paper pulp, the layers being compressed together in such a way as to remain together under normal use conditions, prior to immersion in water, but so as to wholly or partially separate upon immersion in water, so that the particles are easily flushed down a toilet after use. The product also has uses other than for animal litter, such as in floor sweeping, as a mulch, packing, or otherwise.

3 Claims, 5 Drawing Figures

PARTICULATE PAPER PRODUCT, ESPECIALLY FOR USE AS ANIMAL LITTER

This application is a continuation-in-part, of application Ser. No. 463,100, filed Feb. 2, 1983 now abandoned.

BACKGROUND OF THE INVENTION

This invention relates to a particulate paper product, especially adapted for use as an animal litter, for example, cat litter.

Commercially available cat litters frequently contain clay and odor producing additives. After use, the clay must be discarded in some manner. One is tempted to flush used cat litter down the toilet, but conventional cat litter frequently contains fine particulate solids which can collect in and ultimately clog the plumbing in such cases.

It has been proposed to produce cat litter from cellulosic products containing various additives, such as binders which maintain the litter particles in a coherent form even when emersed in water. As a result, such particles are not "easily flushable," since they may tend to float; and being compressed, do not have sufficient surface area to be caught up in the swirling water of the flushing toilet.

Accordingly, it is an object of this invention to provide an animal litter which is easily flushable, and biodegradable. It is a further object of the invention to provide an article of manufacture having other uses, such as a floor sweeping material, a collector for oil and other drippings, a mulch or a carrier for other materials such as scents, disinfectants, germicides or the like. Use possibly as a packing material like styrofoam peanuts.

SUMMARY OF THE INVENTION

These and other objects are provided in accordance with the present invention, which provides an article of manufacture comprising a multiplicity of discrete absorbant particles of joined layers of formed paper pulp, the layers being compressed together in such a way as to maintain the layers in close relationship prior to immersion in water, but allowing whole or at least partial separation upon immersion in water. More particularly, the present invention provides an animal litter consisting essentially of a multiplicity of such particles.

DETAILED DESCRIPTION

The formed paper pulp which is the precursor of the discrete absorbant particles according to the present invention is paper pulp that has been processed to form batts, laps, sheets, waddings, fluffs, twisted paper yarns, or a combination of such, such as paper fluff and paper waddings. For example, the present invention can be formed from layers of paper waddings surrounding paper fluff, or paper waddings alone, formed into the shape of a pillow.

Five of these embodiments are illustrated.

The layers of formed paper pulp which are joined to form the discrete absorbant articles can be portions of a single piece of paper, such as in the case of formed paper pulp derived from twisted paper yarn; or the layers can be discrete pieces of paper, such as parallel plies of paper wadding, compressed together at the edges.

A preferred embodiment of the present invention constitutes discrete sections of twisted paper yarns. Twisted paper yarn can be made in accordance with the teachings of R. C. Sokolowski, U.S. Pat. No. 3,381,460, the disclosure of which is incorporated by reference. For use in accordance with the present invention, the twisted paper yarn can be formed and rolled upon a bobbin, such as shown in U.S. Pat. No. 3,381,460, and subsequently cut into lengths on the order of 1 cm to 2 cm in length; or the twisted paper yarn can be cut into such lengths immediately after the yarn is formed, without winding the yarn on a bobbin, and as part of the same operation which forms the yarn.

Figure 1:
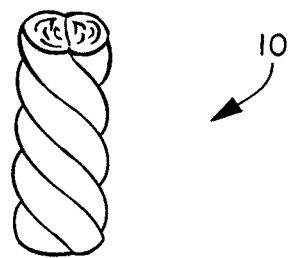
FIG. 1 is an illustration of one embodiment of the present invention, in which the formed paper pulp is derived from twisted paper yarn.

FIG. 1 of the drawings illustrates such a discrete particle formed from twisted paper yarn, in which the reference character 10 designates a particle of such twisted paper yarn.

Figure 2:
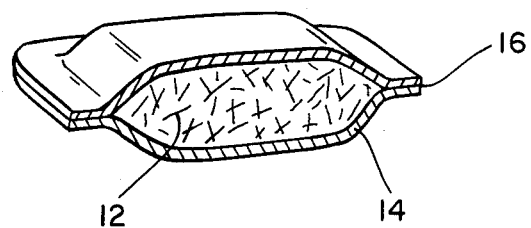
FIG. 2 is a cutaway view of a second embodiment of the present invention, in which the formed paper pulp is derived from a combination of paper fluff and paper wadding formed together in the shape of a pillow.

Another embodiment of the invention is illustrated in FIG. 2, in which the central portion 12 of the pillow shaped particle is formed paper pulp derived from paper fluff, and the outer portion 14 is paper wadding held together by a compression seal around the periphery of the pillow, as designated by the numeral 16.

Figure 3:
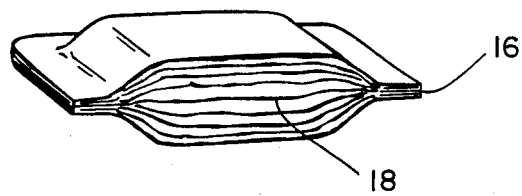
FIG. 3 is a cutaway view of the third embodiment of the invention, in which formed paper pulp is derived from multiple layers of paper wadding only.

FIG. 3 illustrates yet another embodiment of the invention, wherein the discrete absorbant particle is formed of multiple layers of paper wadding 18 only, joined together at the edge by a compression seal 16. The periphery of all tissue pillows may be wholly bonded or at least ¼ bonded around the peripheral area.

Either the pillow shown in FIG. 2 or the pillow shown in FIG. 3 can be formed by die stamping sheets of paper waddings (with or without interspersed paper fluff) to cause a compression seal around the periphery of the pillow. It has been found convenient and effective to use 11 ply paper wadding for these embodiments, two sheets of paper wadding being used together to provide a 22 ply pillow as the particle.

In either of the pillow configurations, or in the twisted yarn configuration, the layers are preferably compressed together with moisture present and dried by heating to impart to the particles a unitary construction. It has been found that with such a construction, all of the layers are maintained in close relationship prior to immersion in water, but allow separation upon immersion in water, as for example when the particles are flushed in a toilet. The particles when thus separated exhibit a high surface area and are accordingly easily flushed down a toilet for disposal.

As an alternative to the method described above for production of the pillows illustrated in FIGS. 2 and 3 (i.e., die pressing around all edges), layers of wadding can be passed through gang slitters, to produce strips of wadding which can then be cut by rotary knife or die presses, to provide a compression seal along at least two edges only of the pillows.

Figure 4:
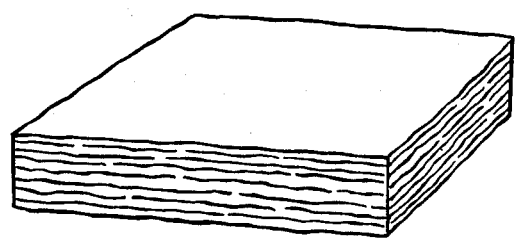
FIG. 4 is a cutaway view of a fourth embodiment of the invention, in which the particle is formed by cutting a prewetted pulp sheet.

FIG. 4 illustrates a further embodiment of this invention, wherein the particles were die cut from an unbleached papermaking pulp sheet. In order to improve the cutting operation, the pulp sheet is first wetted with about an equal weight amount of water. This softens the pulp sheet and causes it to expand exposing layered structure as shown. Although the size and shape of the particles is not a limiting factor in the scope of this invention, the particular particles produced were about 0.3 inch square with a thickness of about 0.0625 inch and a bulk density of about 0.3 grams per cubic centimeter.

Figure 5:
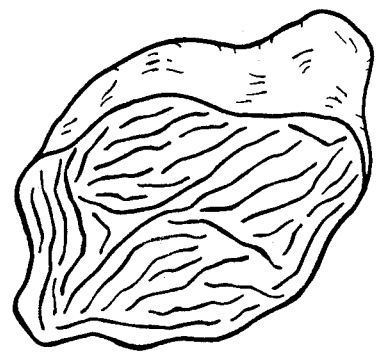
FIG. 5 is a cutaway view of a fifth embodiment of the invention, in which the particle is formed by agglomerating wood fibers, such as fiberized newsprint, into beads.

FIG. 5 illustrates yet another embodiment of this invention, wherein the particles were prepared from fiberized newsprint by forming beads in a commercially available agglomeration apparatus of the disc pelletizer type[1]. In this apparatus the fibers are balled or agglomerated by the action of a rotating disc which is pitched at an angle. The circular motion of the rotating disc causes the fibers to ball up and migrate to the edge of the disc for collection. The resulting particles are very generally spherical, but highly irregular. Particle size varies widely and particles can be screened to retain the desired size, which is preferably about 0.25–0.375 inch in diameter. Unwanted particles can be recycled. The beads illustrated in FIG. 5 were prepared by slurrying fiberized newsprint with about 450 weight percent water, mixed in a tyne-type beater (turbulator), fed to the rotating disc pelletizer, dried, and screened. The resulting product had an irregular bead-like shape and a bulk density of about 0.15–0.25 grams per cubic centimeter. Although newsprint was used as the fiber source, any other suitable fiber source can be used. Because of economic considerations, however, secondary fiber sources are preferred over virgin fibers. The beads appear homogeneous in structure on their outer surfaces, but as the cross-section in FIG. 5 illustrates, the beads actually have a laminar or layered internal structure.

[1] Disc pelletizer available from Ferro-Tech, Wynadotte, Mich.

Although the beads appear homogeneous in structure on their outer surfaces, the cross-section illustrated in FIG. 5 illustrates that the beads actually have a laminar or layered internal structure.

The particles according to the present invention are found to be discrete absorbant particles, lightweight, free of lint, having a high rate of absorbancy; and are stable, i.e., do not break up into pieces in the litter box or in the water stream in the sewage system. They can be formed in uniform size, sterile (or at least highly sanitary, as opposed to waste products which have been suggested for use as animal litter); and are odorless and of relatively neutral pH. Because of their inherent high absorbancy and relatively fast drying properties as compared to clay litter, litter boxes containing the animal litter according to the present invention do not collect urine on the bottom of the litter box for solidification and consequent attraction of bacterial growth. Small portions of the litter can be removed and flushed as necessary, or the entire contents of the litter box can be periodically flushed as desired.

In addition, odor absorbants such as baking soda, activated carbon, or other sorbent materials can be impregnated into the layered structure or simply interspersed with the particles of this invention to help reduce odors. A particularly preferred additive would be a starch binder, such as Pearl Starch 5594 or 5583 of General Corn Products in a suspension of 6% starch solids, as a lint preventor to reduce dust. The amount of starch would generally be between about 1 and about 2 percent of the total wet composition.

I claim:

1. A multiplicity of particles comprising agglomerated wood fibers having a generally irregular spherical shape and an internal layered structure, said particles being useful as an animal litter and having a bulk density from about 0.15 to about 0.25 grams per cubic centimeter.

2. The particles of claim 1 wherein the wood fibers are fiberized newsprint.

3. The particles of claim 2 having a size of from about 0.25 to about 0.375 inch in diameter.

* * * * *